United States Patent [19]

Sakurai et al.

[11] Patent Number: 5,142,599

[45] Date of Patent: Aug. 25, 1992

[54] PUSH-ON CONNECTOR

[75] Inventors: Yuji Sakurai; Mitsuru Takeda, both of Tokyo, Japan

[73] Assignee: Daiichi Denshi Kogyo Kabushiki Kaisha, Japan

[21] Appl. No.: 765,996

[22] Filed: Sep. 26, 1991

[30] Foreign Application Priority Data

Sep. 29, 1990 [JP] Japan .............................. 2-102519[U]

[51] Int. Cl.⁵ .......................... G02B 6/00; G02B 6/36
[52] U.S. Cl. ..................................................... 385/78
[58] Field of Search ...................................... 385/76, 78

[56] References Cited

U.S. PATENT DOCUMENTS 4,682,848 7/1987 Cairns et al. ........................ 385/69

Primary Examiner—Akm E. Ullah
Attorney, Agent, or Firm—Silverman, Cass & Singer

[57] ABSTRACT

A push-on connector of which receptacle unit and plug unit can be coupled and locked by an engagement between a stopper on the receptacle unit and an engaging reentrant portion on the body of the plug unit, they can be locked and unlocked by an axial movement of a slide ring controlled by pressing and pulling force applied on a coupling provided over the slide ring. An abutting portion is provided on the connector body of the plug unit to limit retracting movement of the slide ring to keep restoring spring within elastic limit of the spring.

5 Claims, 3 Drawing Sheets

FIG_1
*PRIOR ART*
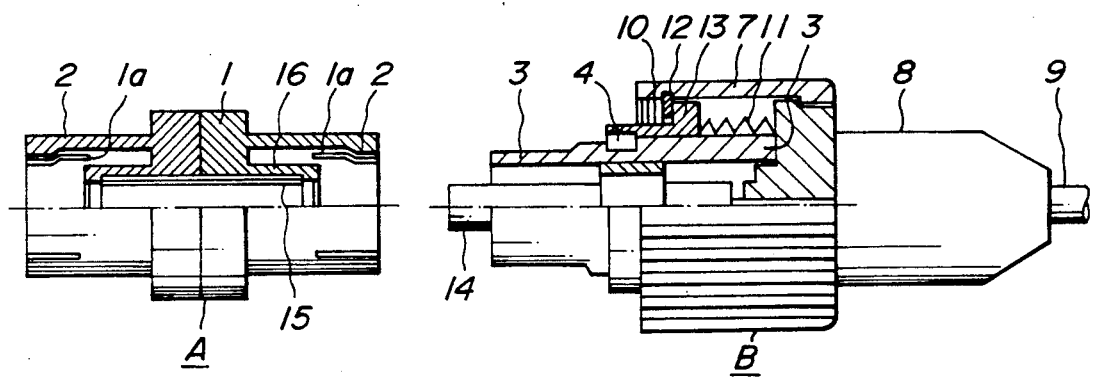
FIG_2a
*PRIOR ART*
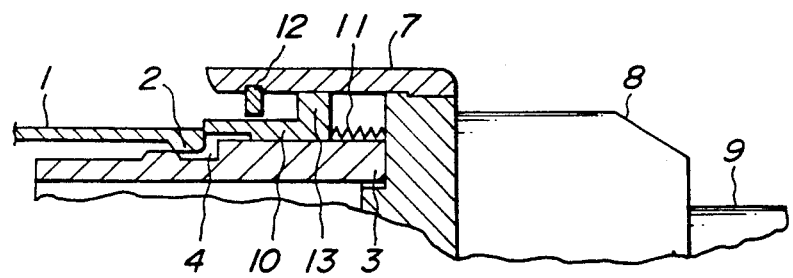
FIG_2b
*PRIOR ART*
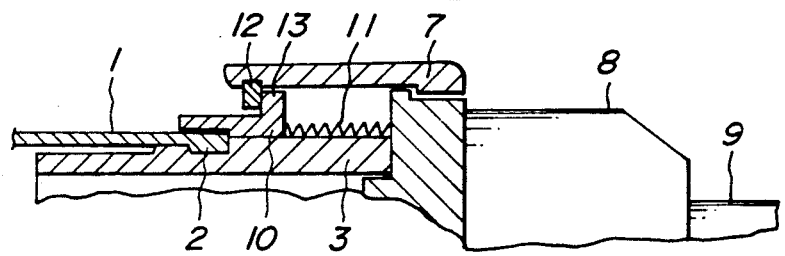

FIG_5
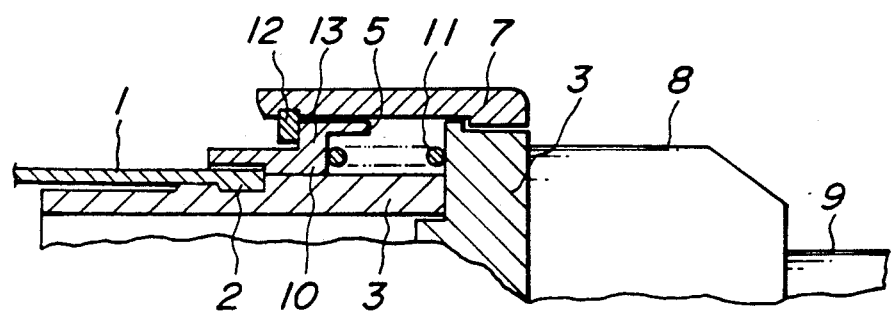
FIG_6
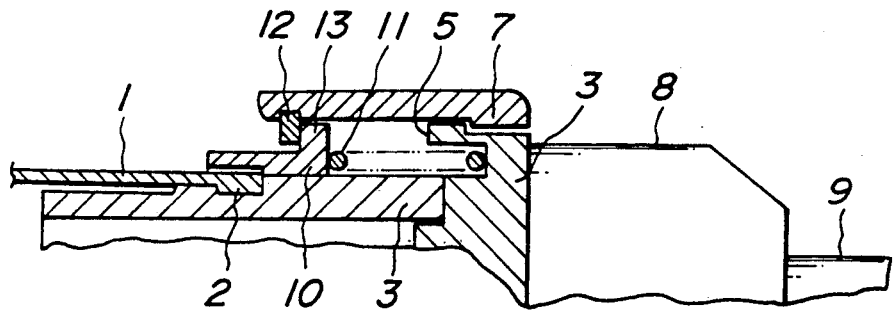

PUSH-ON CONNECTOR

BACKGROUND OF THE INVENTION

1. Field of the Invention

The present invention relates to a push-on connector used as an optical connector or a coaxial cable connector.

2. Prior Art Description

The assignee of the present invention had proposed a locking construction of such a connector in a Japanese utility model application No. 21,277/87 dated Feb. 18, 1987 (opened No. 164,183/88 opened on Oct. 26, 1988).

FIGS. 1 and 2 of the published utility model show the prior art connector namely push-on connector having the locking construction.

In order to help a better understanding of the present invention, the prior art will be explained at first. FIG. 1 shows in general the locking construction of the connector of the utility model. In FIG. 1, A indicates an adaptor or female connector and B indicates a plug or male connector to be inserted and mated with the adaptor A. Between a coupling 7 and a connector body of the plug B, a slide ring 10 is provided. The diameter of the slide ring 10 is so selected to abut against a stopper 2 provided in the adapter A on its entire periphery or divided into a plural number. The FIGURE shows a case of providing the stopper 2 on the entire periphery of the adaptor A. Furthermore, a spring member 11 is provided between the slide ring 10 and the body 3 by which spring member 11 the slide ring 10 is depressed or biased towards the direction of the adapter A. Also at the inner periphery of the coupling 7, a stopper ring 12 is provided. A stopper 13 is provided around the outer periphery of the slide ring 10 to engage with the stopper ring 12 and by which the outer extreme position of the slide ring 10 is limited. By this arrangement, the slide ring 10 normally occupies a position to cover an engaging reentrant portion 4. In FIG. 1, 14 of the plug B shows a ferrule to hold an optical cable at its center and 1a of the adapter A shows an axial slit provided in the body 1 and 15 is a slit sleeve and 16 is a stopper.

In the above construction of the connector, when the plug B is inserted into the adapter A by holding the coupling 7, the stopper 2 of the adapter A depresses the front end surface of the slide ring 10 against the spring force of the coil spring member 11. The slide ring 10 moves backward towards the holding portion 8 of the cable 9 as can be seen from FIG. 2a so that the stopper 2 of the adapter A falls into the engaging reentrant portion 4 as can be seen from FIG. 2b. Then the slide ring 10 restores its original position by the bias force of the coil spring 11 and covers outer periphery of the stopper 2 engaging by dropping into the engaging reentrant portion 4 so as to prevent disengagement of the connectors and thus the connection and locking motion is completed. At dislocking the connector and its connection, contrary to the above operation the coupling 7 is pulled backwardly. Then the stopper ring 12 of the coupling 7 presses the stopper 13 of the slide ring 10 against the bias force of the spring 11 towards the holding portion 8 of the cable 9 to expose the engaging reentrant 4. By the further pulling force applied to the coupling 7, the stopper 2 of the receptacle A is disengaged from the engaging reentrant 4 so that the connectors are uncoupled and the connection is broken at the same time.

This kind of the connector provided with the locking construction can be handled easily for its two kind of operations i.e. locking and connecting by holding only the coupling 7 so that it has an advantage of simple handling in a single operation to avoid a double operation. However, during actual use thereafter it has shown up points still to be solved and improved.

At the disengagement motion of the locked connector in the above locking construction, as has been explained, the coupling 7 is pulled backwards and by this pulling force, the slide ring 12 is retracted against the bias force of the coil spring 11 towards the holding portion 8 and by a further pulling force the stopper 2 disengages from the engaging reentrant portion 4 to dislock the locked connector. At this time, all the dislocking force is conveyed to various portion of the connector via the spring 11.

In other words, all the dislocking force is loaded to the spring 11 so that after a number of coupling and uncoupling operations of the connector, the spring 11 may have a permanent deformation and the bias force to be applied to the stopper 13 is decreased gradually. This phenomenon is so-called "fatigue of spring".

This fatigue of spring can be avoided by selecting the spring member within a certain condition. But by the recent requirement of miniaturization of connectors, the space accommodating the spring member is narrowly limited thus the selection of the spring becomes more and more difficult.

SUMMARY OF THE INVENTION

The present invention is to solve the above-mentioned problems of the prior art push-on connector. More especially, the present invention offers a novel structure of the push-on connector having no fear of causing fatigue of spring at dislocking of the locked connector so that a spring suitable to the locking construction can be selected with more freedom.

In the push-on connector of the present invention, when a pulling force is applied to the coupling 7, the slide ring 10 retracts towards the holding portion 8. But the retractable distance is so selected that the distance is greatest than a distance from the top of the slide ring 10 to a position to expose the engaging reentrant portion 4 and less than the limit causing fatigue of the spring. For this purpose an abutting member or portion 5 is provided between the slide ring 10 and the connector body 3 of which position is selected to satisfy the above condition of the retracting distance.

The limit of fatigue of the spring can be obtained by actual experiments and from the amount of compression and restoration. However, it may be more convenient to estimate an amount of 80% of tolerable torsion stress defined under the standard of JIS B2704 (1987).

The extent of exposure of the engaging reentrant 4 may be enough to allow the stopper 2 of the adapter A to drop into it or to separate from it.

By the construction having the abovementioned abutting member 5, a considerable portion of the disengaging force required for dislocking and uncoupling is accepted by the abutting member 5 and the spring member 11 will not receive a compressive force exceeding the limit of its fatigue.

BRIEF DESCRIPTION OF THE DRAWINGS

FIGS. 1, 2a and 2b show one example of the prior art push-on connector in the partial cross-section and enlarged views;

FIGS. 4 to 6 show further modified embodiment of the connector according to the present invention.

DETAILED EXPLANATION OF THE PREFERRED EMBODIMENT OF THE INVENTION

The invention will be explained by referring to FIGS. 3 to 6 showing embodiment thereof.

Figure 3:
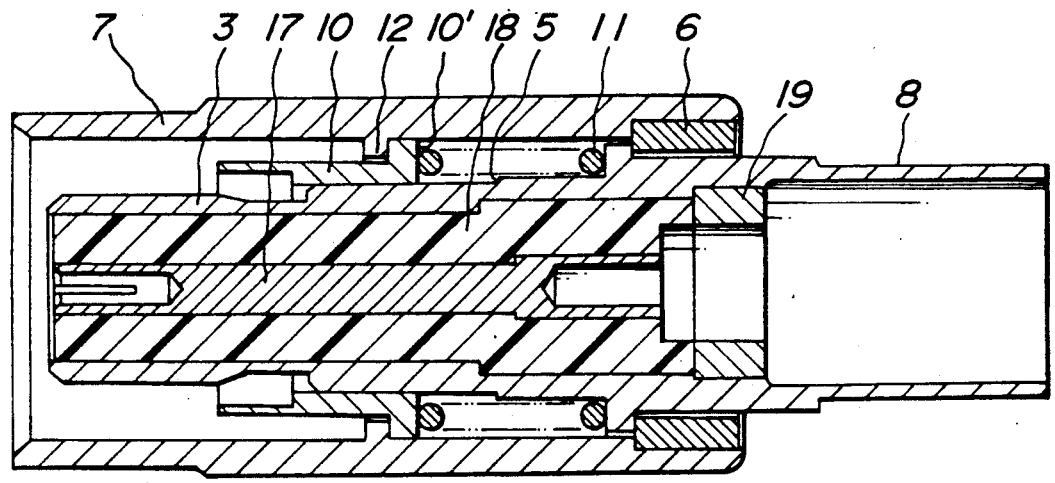
FIG. 3 is a cross-sectional view of plug of the connector of the invention in an enlarged scale.
Figure 4:
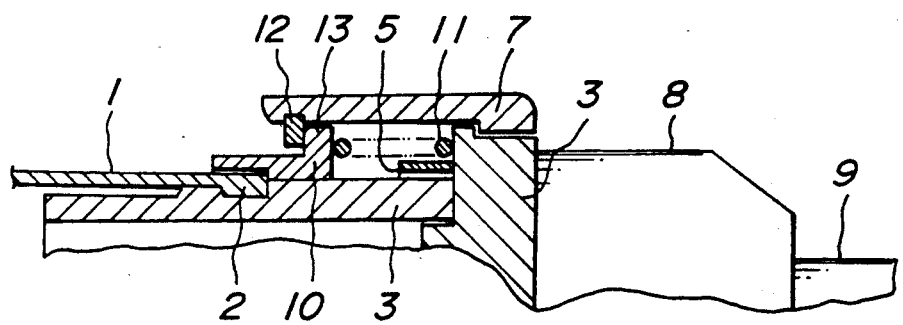

FIG. 3 shows an overall cross-sectional view. FIGS. 4 to 6 are similar view with FIG. 2.

FIG. 3 shows one embodiment of a coaxial connector being applied with the present invention. A central contact 17 of a coaxial cable is fixed by a supporting insulator 18 of a connector body 3. A cylindrical slide ring 10 is provided to cover the whole outside of the connector body 3. This slide ring 10 is normally biased towards the outside or left side of the drawing from said connector body 3 by a compressed coil spring 11. The forward pressing force of the coil spring 11 is stopped by a stopper ring 12 abutting against a stopper 13 provided at bottom end of the slide ring 10. Thus the slide ring 10 is not pushed out in a forward direction beyond a certain position.

Between the bottom end surface 10' of the slide ring 10 and a vertical surface of a flange portion of the connector body 3 against which both ends of the coil spring 11 are abutted, there is provided an abutting member or portion 5 being a step portion in the outer periphery of the body 3 in this embodiment. In an actual embodiment, the outer diameter of this coaxial connector is about 10 mm and its overall length is about 30 mm and the axial length of the accommodating space of the coil spring 11 is about 5.5 mm. The diameter of the connector body 3 at a portion mounting the coil spring 11 is about 6 mm or less. A step portion or an abutting member 5 having a height of about 0.3 mm is provided on the connector body 3 at a location of 2 mm measured from the bottom surface 10' of the slide ring 10 contacting with the coil spring 11 in its normal position towards a cable holding portion 8. If the slide ring 10 is retracted towards the cable holding side, the end surface 10' of the slide ring 10 contacting the coil spring 11 abuts against the abutting portion 5 so that the slide ring 10 will no longer retract after its backward stroke of about 2 mm so that the coil spring 11 will not be depressed further.

In FIG. 3, reference numeral 6 indicates a stop ring fixed by a thread joint with the coupling 7. This stop ring 6 prevents the coupling 7 being slid off and detached from the connector body 3. Reference numeral 19 indicates a stop ring fixed by a thread-in the body 3 and securing the supporting insulator 18.

FIG. 4 shows a slightly different embodiment of the present invention, in which a cylinder or a ring is provided at the outer periphery of the body 3 and at inside of the coil spring 11 so that an abutting member 5 is formed to have the same function with the embodiment shown in FIG. 3. In this embodiment, an advantage obtained is in that the existing push-on connector is once dismantled and after arranging the cylinder on the ring on the body 3 reassembled and the fatigue problem of the spring can be avoided.

FIG. 5 shows another embodiment of the present invention. In this embodiment, the abutting member 5 is formed by providing a projecting member extending from the end surface of the stopper 13 of the slide ring 10 towards the cable holding portion 8.

It is preferred to form this projecting member in a form of a tubular shape, however, 3 to 5 studs may be provided equidistantly around the periphery of the stopper 13 of the slide ring 10.

FIG. 6 shows a till further embodiment, in which the abutting member 5 is formed in the shape of a projection extending from right top portion of the body 3 towards the slide ring 10 as shown in the drawing.

At the same time, a recess is provided inside the said projection into which the coil spring 11 is accommodated. By providing such a recess, the housing space of the coil spring can be made larger or longer so that a greater freedom for the selection of the coil spring member can be obtained.

Function of said projection is just same as the abutting member 5 shown in FIG. 3 or FIG. 5.

By providing the aforementioned projection or abutting member 5 according to the present invention, it is possible to completely remove the possibility of occurrence of fatigue of the coil spring 11 and thus heretofore existing limitation for selecting the type and kind of coil spring 11 can be remarkably decreased so that the use of a too hard spring or a too soft spring material can be avoided. Also the mating or disengaging operation can be done with ease and the feeling for handling the connectors can be much improved.

A further advantage of the present invention is that the invention can be applied also to the existing prior art push-on connectors by adding a very minor modification thereto.

What is claimed is:

1. A push-on connector having a receptacle unit and a plug unit mating therewith, the receptacle unit having a receptacle opening provided with axial slits at its periphery and stoppers extending from the peripheral wall of the receptacle opening toward the center axis, the plug unit having a connector body provided with engaging reentrant portion engaging with said stoppers on the receptacle unit on the outer periphery thereof and a coupling member retractable on the connector body toward it cable holding portion, furthermore, a slide ring is provided between the connector body of the plug unit and said coupling member, the slide ring is movable in the axial direction and normally biassed by a spring member arranged between said connector body so that normally its top end covers said engaging reentrant portion but when the plug unit is coupled with the receptacle unit by holding the coupling, the slide ring is depressed relatively backwardly by abutting against the stoppers of the receptacle unit toward the cable holding portion and said stoppers of the receptacle unit drop into then opened and exposed engaging reentrant portion and then the slide ring is restored to the former position to cover the engaging reentrant portion so that the connector units are coupled and locked, wherein the improvement comprises in that an abutting structure is arranged between said slide ring and said connector body in a manner that the retractable distance of the slide ring toward the cable holding portion is over a distance to expose said engaging reentrant portion but not exceeding a limit of fatigue of the spring member.

2. A push-on connector as claimed in claim 1, wherein the abutting structure is a step portion provided on the outer periphery of the connector body mounting the spring member.

3. A push-on connector as claimed in claim 1, wherein the abutting structure is an abutting member formed of a cylinder provided on the outer periphery of the connector body and at inside of the coil member.

4. A push-on connector as claimed in claim 1, wherein the abutting structure is formed from projecting member extending from an end surface of stopper of the slide ring extending toward the cable holding portion.

5. A push-on connector as claimed in claim 1, wherein the abutting structure is formed in a form of projection extending from the connector body toward the slide ring.

* * * * *